United States Patent
Wright

[15] 3,661,449
[45] May 9, 1972

[54] OVERHEAD VISUAL SHUTTER DEVICE

[72] Inventor: John S. Wright, 6115 North Lake Drive Court, Milwaukee, Wis. 53217

[22] Filed: May 19, 1969
[21] Appl. No.: 825,902

[52] U.S. Cl. .................................353/88, 353/27, 353/97, 353/12 D, 355/54, 95/36
[51] Int. Cl. ...................................................G03b 21/14
[58] Field of Search.....................353/88, 97, 120, 121, 122; 355/74, 39, 54; 95/36, 37, 68

[56] References Cited

UNITED STATES PATENTS

| | | | |
|---|---|---|---|
| 28,739 | 6/1860 | Corbett | 95/37 |
| 967,569 | 8/1910 | Schaubert | 95/36 |
| 3,264,767 | 8/1966 | Coffman | 353/120 X |
| 3,280,694 | 10/1966 | Buechner | 355/54 |
| 3,412,480 | 11/1968 | Connell | 353/27 X |
| 3,438,703 | 4/1969 | Winnemann | 353/121 X |
| 3,510,214 | 5/1970 | Crow | 353/97 X |

Primary Examiner—William D. Martin, Jr.
Attorney—Wheeler, House & Wheeler

[57] ABSTRACT

An overhead projector shutter assembly having a frame defining a window and a number of slides movably mounted in the frame to mask the window, the slides being selectively and relatively movable to mask and unmask selected portions of the window or the entire window to project selected portions of the total transparency onto a screen in sequence. The slides are overlapped with each other and with the frame along adjacent edges to completely exclude unwanted light and to promote smoothness of operation on guides which assure accuracy of alignment between the slides and the register pins which locate the transparency.

10 Claims, 8 Drawing Figures

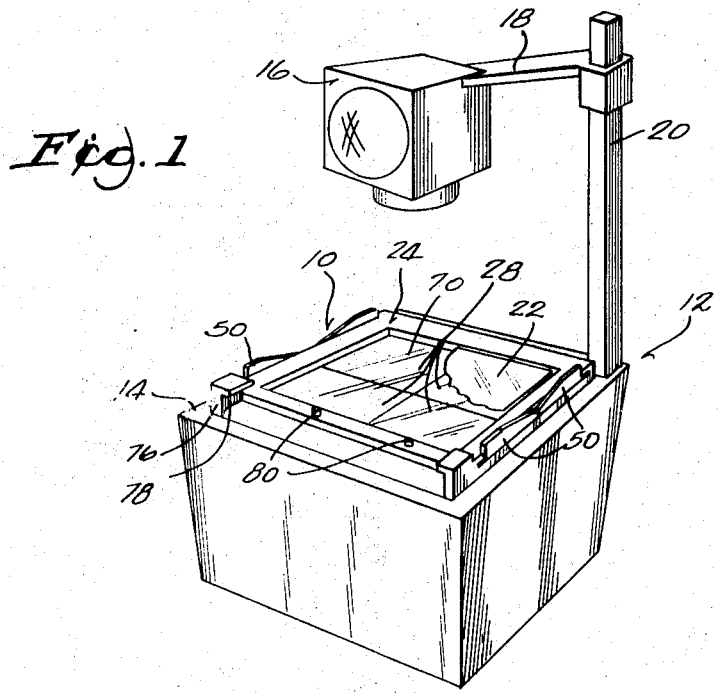
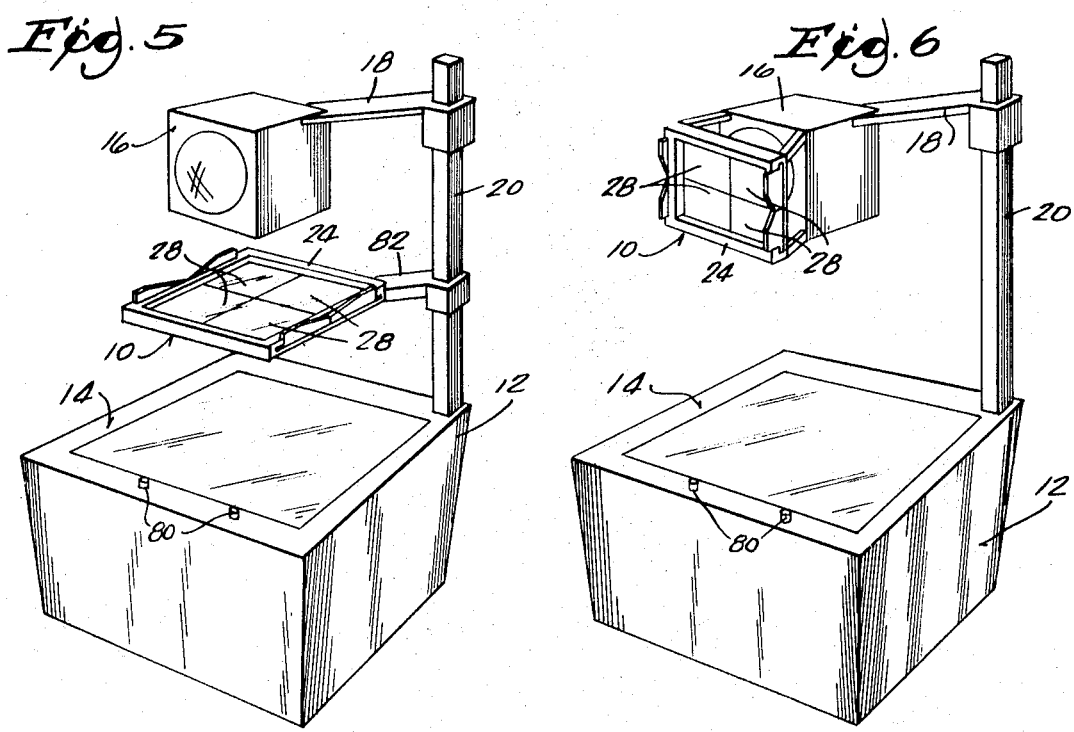

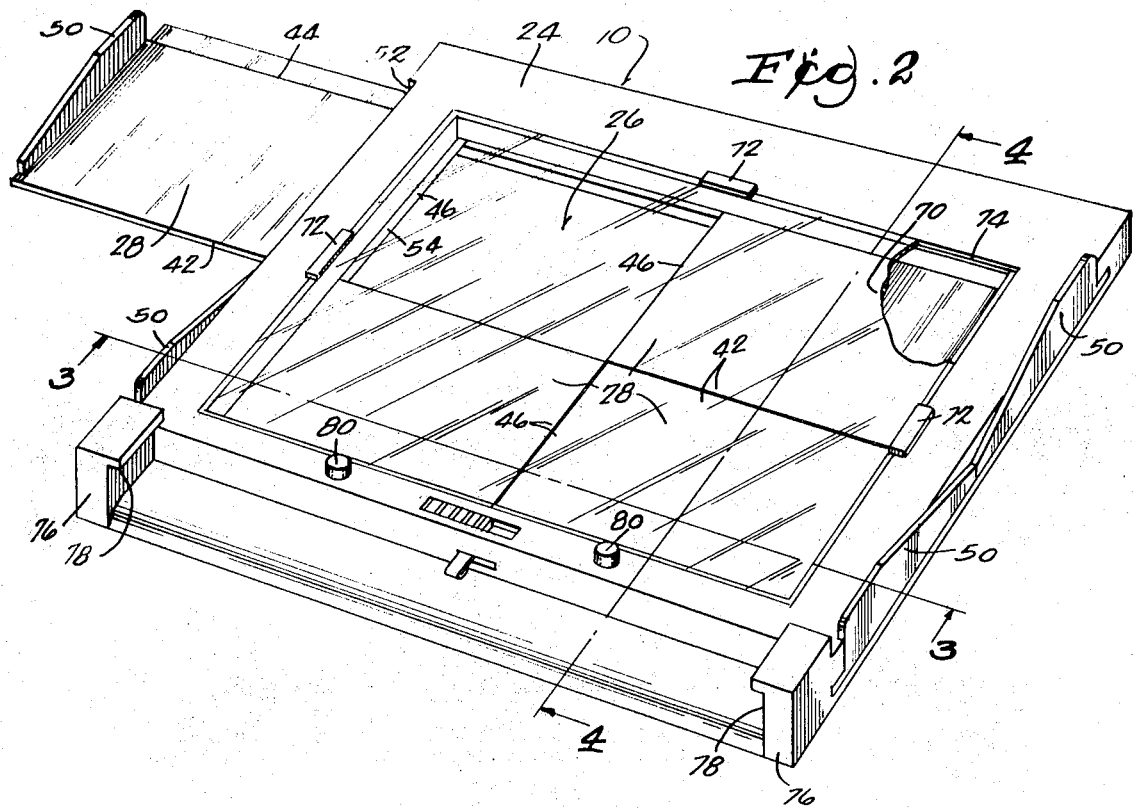
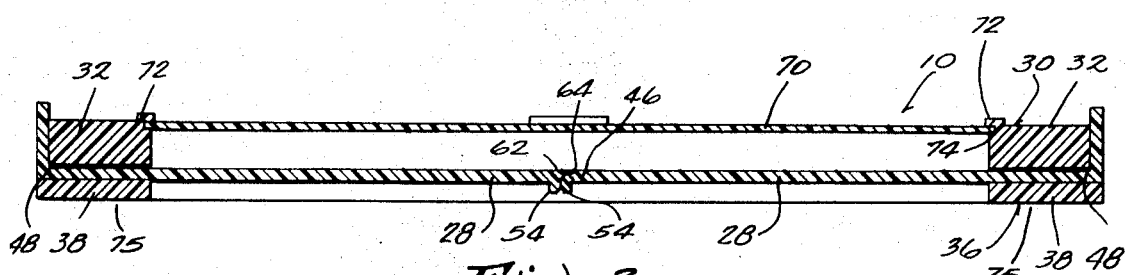
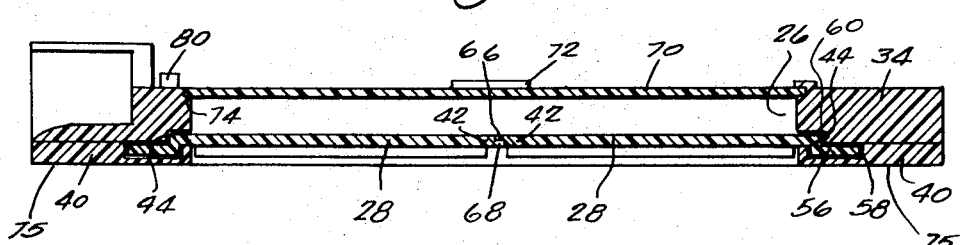
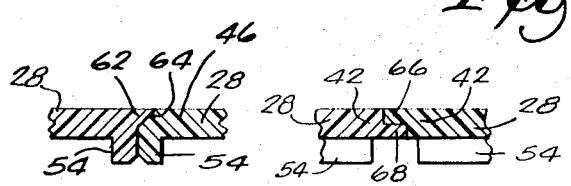

OVERHEAD VISUAL SHUTTER DEVICE

BACKGROUND OF THE INVENTION

In my copending application Ser. No. 748,255, now U.S. Pat. No. 3,524,703, a transparency storage and display book is shown having a pack of transparencies hingedly connected to the free edge of the book cover for pivotal movement onto a stage for viewing and into the book for storage. The transparencies are presented in a predetermined order to show a series of images by placing one transparency at a time onto the stage. If an image in a series is to be reshown the particular transparency containing the image must be found in the pack and replaced on the stage.

If a selected portion of a transparency is to be shown, a separate opaque mask is generally used to block the light and prevent the projection of the other portions of the transparency. Any time a separate mask is used a certain amount of distraction occurs which disrupts the presentation of the transparency.

SUMMARY OF THE INVENTION

The shutter assembly disclosed herein provides for the sequential showing of a series of images using a single transparency. One or more of the transparency sections can be projected at one time and the series of images can be shown or remasked in any desired sequence or order. The shutter assembly includes a frame defining a window and a number of opaque shutters or slides mounted in the frame. The shutters slide into or out of the frame to open or unmask portions of the window and to project selected images on the transparency onto a screen in a predetermined order. Accuracy of alignment of the transparencies is achieved by providing on the frame or on the projector transparency registration pins which are positioned in a fixed relation with respect to the shutters. The shutters have lapping relatively slidable flanges or rabbets arranged to completely mask unwanted light so that no distracting lines of light are projected on the screen. Yet the arrangement allows for the opening of the entire window when the whole transparency is to be projected onto the screen. This is accomplished by overlapping the adjacent edges and ends of the shutters with each other and with the frame.

Other objects and advantages will become apparent from the following description when read in connection with the accompanying drawings in which:

FIG. 1 is a perspective view of an overhead projector with the shutter assembly positioned on the primary stage.

FIG. 2 is a perspective view of the shutter assembly.

FIG. 3 is a view taken on line 3—3 of FIG. 2 showing the overlap at the end of the shutters.

FIG. 4 is a view taken on line 4—4 of FIG. 2 showing the shutter guide arrangement and the overlap arrangement of the edges of the shutters.

FIG. 5 is a perspective view of a modified arrangement of the shutter assembly mounted on the projector.

FIG. 6 is a perspective view of another arrangement of the shutter assembly mounted on the projector.

FIG. 7 is an enlarged view of the overlapped ends of the shutters.

FIG. 8 is an enlarged view of the overlapped edges of the shutters.

DESCRIPTION OF THE INVENTION

Although the disclosure hereof is detailed and exact to enable those skilled in the art to practice the invention, the physical embodiments herein disclosed merely exemplify the invention, which may be embodied in other specific structure.

The shutter assembly 10 of this invention is ordinarily (but not necessarily) used in combination with an overhead projector 12 of the type shown in FIG. 1 which includes a primary stage 14 and a lens housing 16 supported by a bracket 18 on an arm 20. A light is directed from within the primary stage 14 upwardly through the lens housing 16 for projection onto a screen. A transparency 22 is placed on the shutter assembly 10 for projection of the images on the transparency 22 onto the screen.

In accordance with the invention, means are provided for selectively projecting onto the screen portions of the transparency 22 to present the images of the transparency in a predetermined order or sequence. Such means comprises the shutter assembly 10 which includes means for defining a window 26 in the form of a frame 24 and means for selectively masking all or portions of the window 26 by using a number of shutters 28. The frame 24 includes an upper frame part 30 having side members 32 and end members 34 and a bottom frame part 36 having side members 38 and end members 40. The upper frame part 30 is secured to the bottom frame part 36 to define the window 26. The frame 24 is arranged on the projector 12 so that all of the light passes through the window 26. The shutters 28 are moved into and out of light obstructing positions on the frame 26 to mask or unmask portions of the window 26 in a predetermined sequence to control projection of selected images of the transparency onto the screen.

In this regard, means are provided in the frame 24 for masking the window 26 in the form of a number of the opaque shutters or slides 28 each of which has an inside edge 42, an outside edge 44, an inner end 46 and an outer end 48. The slides 28 are mounted for sliding movement between the frame parts 30 and 36 to unmask portions of the window 26 in sequence or to open the entire window 26. Each slide 28 is actuated by means of a flange 50 provided on its outer end 48. A recess 52 can be provided in the side members 32 of the upper frame part 30 to receive each of the flanges 50. The upper portion of each flange 50 projects above the side members 32. The outward movement of each of the slides 28 is limited by means of a stop or ridge 54 provided on the inner end 46 of each of the slides 28 in a position to engage a side member 38 of the bottom frame part 36. The slides 28 can be actuated in any sequence or as many at one time as desired. The shutters can be actuated simultaneously to unmask more than one portion of the transparency at one time.

The slides 28 are prevented from wobbling in the shutter assembly 10 by means of a guide in the form of an offset flange or ledge 56 provided on the outer edge 44 of each of the slides 28 and a groove 58 provided in the end members 40 on the bottom frame part 36. The ledges 56 are retained in the grooves 58 by the end members 34 which overlie the ledges 56 and are provided with a notch 60 to provide clearance for the outside edge 44 of the slides 28. The width of the groove 58 is substantially equal to the width of the ledge 56 to assure straight line motion in the movement of the slide 28 into and out of the shutter assembly 10.

Initially, the window 26 is normally masked completely. To prevent the projection of lines of light between the slides 28 a lap joint is provided between the inner ends 46 of oppositely disposed slides 28 and a lap joint provided between the inside edges 42 of adjacent slides 28, as seen in FIGS. 3 and 4. The lap joint at the ends 46 is provided by means of an angled projection or flange 62 provided across the end 46 of one of the slides 28 and a beveled edge 64 provided across the end 46 of the opposite slide 28. On complete closure of the slides 28, the ledges 62 will matingly engage the beveled edge 64 to prevent the projection of light through the line of contact between the ends 44 of the slides 28. The lap joint at the inside edges 42 of adjacent slides 28 is provided by means of an upper flange 66 provided on the inside edge 42 of one of the slides 28 and a lower flange 68 provided on the inside edge 42 of the adjacent slide 28. The flange 66 will lap the flange 68 whenever any portion of the inside edges 42 of the slides 28 are adjacent each other. Not only do these joints exclude undesirable leakage of light but they also provide guidance for very smooth movement of the slides.

The shutter assembly 10 can be adapted for use as an auxiliary stage as shown in my copending application Ser. No. 748,255 by providing means for supporting a transparency on the frame 24. Such means can be in the form of a transparent sheet of plastic or glass 70 retained by tabs 72 in a groove 74 provided in the side members 32 and end members 34 of the upper frame part 30 as shown in FIGS. 2, 3 and 4. Means can also be provided on one of the end members 32 for supporting a transparency storage and display book as shown in copending application Ser. No. 748,255 in the form of side wall extensions 76 having channel shaped grooves 78. In this type of a book, a pack of transparencies are hingedly connected to the free edge of the cover for successive pivotal movement of the transparencies onto the transparent glass 70. The auxiliary stage is retained in a fixed position on the primary stage by providing an adhesive tape 75 at each of the corners of the frame 24.

Exposure of an identical portion of each of the transparencies 22 is provided by means of register pins 80 located in a predetermined relation to the slides or shutters 28. The pins 80 may be provided on the primary stage 14 or on one of the end members 34 of the upper frame part 30. Openings are provided in each of the transparencies 22 as shown in my copending application Ser. No. 748,255 which are engageable with the pins 80 to align the transparencies 22 in the same position on the glass 70.

The shutter assembly 10 can also be attached to the projector 12 as an independent unit as shown in FIGS. 5 and 6. In FIG. 5 the shutter assembly 10 is shown as an attachment secured to the upright arm 20 by means of a bracket 82. The shutter assembly 10 is essentially the same as described above having shutters 28 mounted for sliding movement in a frame 24. The frame 24 is mounted in a transverse relation to the light path in the projector 12. In FIG. 6 the shutter assembly 10 is shown attached to the front of the lens housing 16 by means of brackets 84. In each of the arrangements shown in FIGS. 5 and 6, accuracy of alignment of the transparency 22 with respect to the shutter assembly 10 is achieved by providing the registration pins 80 on the surface of the primary stage 14. It is also possible to incorporate the shutter assembly 10 as an integral part of the primary stage 14. In all of these arrangements the size of the window 26 will vary depending on the cross directional size of the light path.

What is claimed is:

1. A stage for supporting transparencies in an overhead projector system, said stage comprising a frame with inner and outer margins and a fullsize projection opening, a transparent sheet mounted on said frame for the support of transparencies to be projected, register pins on the frame for the precise location on said sheet of successive transparencies for projection, and a shutter having means mounting it on said frame for movement beneath the transparent sheet on which the transparencies are supported.

2. A stage in accordance with claim 1 in which a plurality of shutters are disposed beneath the transparent sheet for relative movement between positions to open and to mask specifically identified portions of the sheet and the transparency thereon, margins of the respective shutters having edge portions lapping each other and respective portions of the frame.

3. A stage in accordance with claim 2 in which the frame comprises side members with slots through which respective shutters are movable outwardly from completely effective mask positions to positions in which areas of said transparent sheet controlled by the respective shutters are substantially fully exposed.

4. A stage according to claim 3 in which the shutters and frame have mutually engageable limiting means for restraining outward shutter movement beyond the last mentioned positions.

5. For use with an overhead projector, a shutter assembly having a frame provided with inner and outer margins and a full size projection opening, a set of masks movable between first positions for completely closing said opening and second positions for completely exposing said opening and selected positions for closing only selected portions of said opening, and first guide means on the inside margin of the frame and additional guide means on the masks for guiding said masks for movement between said positions, whereby said masks may pass to their respective second positions, and means for limiting the movement of said masks to preclude movement from their said first positions to points materially beyond said second position.

6. A shutter assembly according to claim 5 in which said masks have handle flanges exposed at the outer margins of said frame.

7. A shutter assembly according to claim 6 in which the means for limiting mask movement comprises flanges engageable with the inner margins of the frame.

8. A shutter assembly according to claim 5 in which the frame comprises upper and lower elements spaced to provide slots through which said masks are movable.

9. A shutter assembly according to claim 8 in which the upper elements have exterior recesses and the masks have handle flanges seated therein in the said first positions of the masks.

10. A shutter assembly according to claim 5 in which the additional guide means comprises lapping marginal portions of the respective masks which are in engagement.

* * * * *